United States Patent
Fuller

(10) Patent No.: US 6,852,417 B2
(45) Date of Patent: Feb. 8, 2005

(54) COMPOSITION FOR IMPROVING ADHESION OF BASE-RESISTANT FLUOROELASTOMERS TO METAL, CERAMIC OR GLASS SUBSTRATES

(75) Inventor: Robert Earl Fuller, Newark, DE (US)

(73) Assignee: DuPont Dow Elastomers, LLC, Wilmington, DE (US)

( * ) Notice: Subject to any disclaimer, the term of this patent is extended or adjusted under 35 U.S.C. 154(b) by 0 days.

(21) Appl. No.: 10/430,243

(22) Filed: May 5, 2003

(65) Prior Publication Data

US 2003/0225189 A1 Dec. 4, 2003

Related U.S. Application Data

(60) Provisional application No. 60/379,335, filed on May 9, 2002.

(51) Int. Cl.[7] .................. B32B 15/08; B32B 17/10; B32B 18/00; B32B 27/26
(52) U.S. Cl. ................ 428/421; 428/426; 428/447; 428/448; 428/457
(58) Field of Search ............... 528/29, 88, 89, 528/93, 97; 428/421, 426, 447, 448, 457

(56) References Cited

U.S. PATENT DOCUMENTS

| | | | |
|---|---|---|---|
| 4,051,161 A | | 9/1977 | Proskow |
| 4,536,447 A | * | 8/1985 | Hsu .......................... 428/392 |
| 5,045,143 A | | 9/1991 | Arcella et al. |
| 5,284,611 A | | 2/1994 | Grootaert et al. |
| 5,478,652 A | | 12/1995 | Grootaert et al. |
| 5,500,042 A | | 3/1996 | Grootaert et al. |
| 5,714,532 A | | 2/1998 | Osterholtz et al. |
| 5,882,466 A | | 3/1999 | Grootaert et al. |
| 5,919,331 A | | 7/1999 | Smith et al. |
| 6,080,268 A | | 6/2000 | Smith et al. |

FOREIGN PATENT DOCUMENTS

| | | |
|---|---|---|
| DE | 19945613 A1 | 4/2001 |
| EP | 354510 | 2/1990 |
| EP | 420662 | 3/1991 |
| EP | 0617084 B1 | 8/1998 |
| EP | 1070750 | 1/2001 |
| GB | 1393488 A * | 5/1975 |
| JP | 2089635 | 3/1990 |
| JP | 6248115 | 9/1994 |

* cited by examiner

*Primary Examiner*—Ramsey Zacharia

(57) ABSTRACT

Adhesion promoting primer compositions comprising mixtures of a) an epoxy-silane, b) a polyhydroxy compound, and c) an organo-onium compound improve the adhesion between metal, ceramic or glass surfaces and base-resistant polyhydroxy or peroxide curable fluoroelastomers.

7 Claims, No Drawings

COMPOSITION FOR IMPROVING ADHESION OF BASE-RESISTANT FLUOROELASTOMERS TO METAL, CERAMIC OR GLASS SUBSTRATES

CROSS-REFERENCE TO RELATED APPLICATIONS

This application claims the benefit of U.S. Provisional Application No. 60/379,335 filed May 9, 2002.

FIELD OF THE INVENTION

This patent relates to compositions that provide enhanced adhesion between polyhydroxy-curable base-resistant fluoroelastomers and metal, ceramic or glass surfaces; in particular, to compositions containing an epoxy-silane, a polyhydroxy compound and an organo-onium compound.

BACKGROUND OF THE INVENTION

Bonding or adhesion of fluoroelastomers to metal, ceramic or glass substrates is important for some end use applications such as automotive shaft seals. Conventional fluoroelastomers comprising copolymerized units of vinylidene fluoride ($VF_2$), hexafluoropropylene (HFP) and, optionally, tetrafluoroethylene (TFE) are typically bonded to metals by use of a silane, particularly an amino-silane primer.

Recently it has become desirable to employ in automotive applications fluoroelastomer seals which are particularly resistant to attack by basic fluids. Examples of such base-resistant fluoroelastomers include, but are not limited to 1) fluoroelastomers containing copolymerized units of tetrafluoroethylene and propylene (P); and 2) fluoroelastomers containing copolymerized units of ethylene (E), tetrafluoroethylene and a perfluoro(alkyl vinyl ether) (PAVE). These fluoroelastomers may also contain copolymerized units of vinylidene fluoride or a cure site monomer. When copolymerized units of vinylidene fluoride are present in the fluoroelastomer, the level is preferably less than about 10 weight percent in order to optimize resistance of the fluoroelastomer to attack by base.

Base resistant fluoroelastomers are more difficult to bond to metal, ceramic or glass substrates than are conventional fluoroelastomers. The widely used amino-silane class of primers are largely ineffective by themselves. EP 0617084 B1 (Grootaert et al.) discloses base-resistant TFE/P/$VF_2$ fluoroelastomer compositions which contain a fluoroaliphatic sulfonyl compound. Such compositions, when used with an amino-silane primer, have improved adhesion to metal surfaces. JP 6-248115 (Kaneko et al.) discloses epoxy-silane primer compositions for bonding base-resistant TFE/P/$VF_2$ fluoroelastomers to metal surfaces.

It would be desirable to further improve the adhesion of base-resistant fluoroelastomers to metal, ceramic or glass substrate surfaces, especially for fluoroelastomers containing no copolymerized vinylidene fluoride.

SUMMARY OF THE INVENTION

The present invention is directed to adhesion promoting primer compositions which comprise a) an epoxy-silane, b) a polyhydroxy compound, and c) an organo-onium compound.

The invention is also directed to laminates comprising:
a) a first layer of a substrate selected from the group consisting of metals, ceramics and glasses;
b) a second layer of a primer composition comprising an epoxy-silane, a polyhydroxy compound and an organo-onium compound; and
c) a third layer of a base-resistant curable fluoroelastomer composition comprising i) a base-resistant fluoroelastomer, ii) a curing agent, and iii) an acid acceptor.

DETAILED DESCRIPTION OF THE INVENTION

Adhesion promoting primer compositions of the present invention comprise mixtures of a) an epoxy-silane, b) a polyhydroxy compound, and c) an organo-onium compound.

Examples of epoxy-silanes useful in the primer compositions of this invention include, but are not limited to 3-glycidoxypropyltrimethoxy silane; 3-glycidoxypropyltriethoxy silane; bis-2-[(3-epoxycyclohexyl)ethyl]tetramethyldisiloxane; 1,3-bis(3-glycidoxypropyl)tetramethyl disiloxane; 2-(3,4-epoxycyclohexyl)ethyl trimethoxy silane; 3-glycidoxypropyl dimethylethoxysilane; 3-glycidoxypropyl methyldiethoxysilane; 3-glycidoxypropyl methyldimethoxysilane; and 3-glycidoxypropyl pentamethyldisiloxane. Preferred silanes contain one or more glycidyloxy groups. A particularly preferred silane is 3-glycidoxypropyltrimethoxy silane.

Polyhydroxy compounds which may be employed in the primer compositions of this invention include dihydroxy-, trihydroxy-, and tetrahydroxy-benzenes, -naphthalenes, and -anthracenes, and bisphenols of the formula

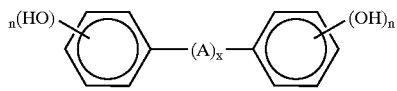

where A is a difunctional aliphatic, cycloaliphatic, or aromatic radical of 1–13 carbon atoms, or a thio, oxy, carbonyl, sulfinyl, or sulfonyl radical; A may optionally be substituted with at least one chlorine or fluorine atom; x is 0 or 1; n is 1 or 2; and any aromatic ring of the polyhydroxylic compound may optionally be substituted with at least one chlorine or fluorine atom, an amino group, a —CHO group, or a carboxyl or acyl radical. Preferred polyhydroxy compounds include hexafluoroisopropylidene-bis(4-hydroxybenzene) (i.e. bisphenol AF or BPAF); 4,4'-isopropylidene diphenol (i.e. bisphenol A); 4,4'-dihydroxydiphenyl sulfone; and diaminobisphenol AF. Bisphenol AF is especially preferred. Referring to the bisphenol formula shown above, when A is alkylene, it can be for example methylene, ethylene, chloroethylene, fluoroethylene, difluoroethylene, propylidene, isopropylidene, tributylidene, heptachlorobutylidene, hepta-fluorobutylidene, pentylidene, hexylidene, and 1,1-cyclohexylidene. When A is a cycloalkylene radical, it can be for example 1,4-cyclohexylene, 2-chloro-1,4-cyclohexylene, cyclopentylene, or 2-fluoro-1,4-cyclohexylene. Further, A can be an arylene radical such as m-phenylene, p-phenylene, o-phenylene, methyl-phenylene, dimethylphenylene, 1,4- naphthylene, 3-fluoro-1,4-naphthylene, and 2,6-naphthylene. Polyhydroxyphenols of the formula

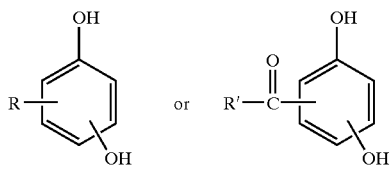

where R is H or an alkyl group having 1–4 carbon atoms or an aryl group containing 6–10 carbon atoms and R' is an alkyl group containing 1–4 carbon atoms also act as effective crosslinking agents. Examples of such compounds include hydroquinone, catechol, resorcinol, 2-methylresorcinol, 5-methyl-resorcinol, 2-methylhydroquinone, 2,5-dimethylhydroquinone, 2-t-butyl-hydroquinone; and such compounds as 1,5-dihydroxynaphthalene and 2,6-dihydroxynaphthalene.

Additional polyhydroxy curing agents include alkali metal salts of bisphenol anions, quaternary ammonium salts of bisphenol anions and quaternary phosphonium salts of bisphenol anions. For example, the salts of bisphenol A and bisphenol AF. Specific examples include the disodium salt of bisphenol AF, the dipotassium salt of bisphenol AF, the monosodium monopotassium salt of bisphenol AF, the methyltributylammonium salt of bisphenol AF and the benzyltriphenylphosphonium salt of bisphenol AF.

Organo-onium compounds which may be used in the primer compositions of the invention include quaternary ammonium, phosphonium, arsonium, and stibonium salts of the formula $R_5R_6R_7R_8Y^+X^-$, where Y is phosphorous, nitrogen, arsenic, or antimony; $R_5$, $R_6$, $R_7$, and $R_8$ are individually $C_1$–$C_{20}$ alkyl, aryl, aralkyl, alkenyl, and the chlorine, fluorine, bromine, cyano, —OR, and —COOR substituted analogs thereof, with R being $C_1$–$C_{20}$ alkyl, aryl, aralkyl, alkenyl, and where X is hydroxide, halide, sulfate, sulfite, carbonate, pentachlorothiophenolate, tetrafluoroborate, hexafluorosilicate, hexafluorophosphate, dimethyl phosphate, and $C_1$–$C_{20}$ alkyl, aryl, aralkyl, and alkenyl carboxylates and dicarboxylates. Particularly preferred are benzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, methyltributylammonium chloride, methyltributylammonium hydroxide, tributylallylphosphonium chloride, tributyl-2-methoxypropylphosphonium chloride, 1,8-diazabicyclo[5.4.0]undec-7-ene, and benzyldiphenyl (dimethylamino) phosphonium chloride. Other useful accelerators are methyltrioctylammonium chloride, benzyltrioctylphosphonium bromide, benzyltrioctylphosphonium chloride, methyltrioctylphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1,8-diazabicyclo(5.4.0)-7-undecenonium chloride, diphenylmethyltriphenylphosphonium chloride, allyltriphenylphosphonium chloride, tetrabutylphosphonium bromide, m-trifluoromethyl-benzyltrioctylphosphonium chloride, and other quaternary compounds disclosed in U.S. Pat. Nos. 5,591,804; 4,912,171; 4,882,390; 4,259,463; 4,250,278 and 3,876,654.

The adhesion promoting primer compositions of this invention typically contain 2 to 40 (preferably 4 to 25) weight percent epoxy-silane. Weight percentages are based on the total weight of the primer composition.

The molar ratio of organo-onium compound to silane, the molar ratio of hydroxy groups on the polyhydroxy compound to silane, and the molar ratio of hydroxy groups on the polyhydroxy compound to organo-onium compound affects the adhesion of fluoroelastomer to metal, ceramic or glass substrate. The molar ratio of organo-onium to silane is typically between 0.05:1 and 5:1 and is preferably between 0.15:1 and 1.5:1. Typically the molar ratio of hydroxy groups on the polyhydroxy compound to silane is between 0.25:1 and 20:1, preferably between 0.5:1 and 2:1. The molar ratio of hydroxyl groups on the polyhydroxy compound to organo-onium is typically between 0.15:1 to and 1.5:1, preferably 0.2:1 to 1:1.

Primer ingredients are typically dissolved in a solvent such as an alcohol, low molecular weight ether, ketone or ester. Methanol is a preferred solvent.

This invention is also directed to laminates comprising: a) a first layer of substrate selected from metals, ceramics and glasses; b) a second layer of a primer composition comprising an epoxy-silane, a polyhydroxy compound and an organo-onium compound; and c) a third layer of a base-resistant fluoroelastomer composition comprising i) a base-resistant fluoroelastomer, ii) a curing agent, and iii) an acid acceptor.

Metal surfaces used in the laminates of this invention include ferrous metals (e.g. iron, steel, stainless steel, etc.), aluminum, copper alloys, magnesium alloys and the like. These surfaces occur on such parts as rotating shaft seals (e.g. crank shaft seals, wheel bearing seals, mechanical seals, etc.), reciprocating seals (e.g. valve stem seals, etc.), and bonded metal-rubber parts such as solenoid tips, bonded piston seals, diaphragms, metal gaskets, etc.

Ceramic substrates used in the laminates of this invention are refractory, inorganic, nonmetallic materials such as silicon nitride, silicon carbide, alumina, zirconium and clays. Glass substrates used in the laminates of this invention include fused mixtures of silicates of the alkali and alkaline earth metals, or heavy metals.

By "base-resistant fluoroelastomer" is meant a fluoroelastomer which contains less than 15 weight percent copolymerized units of vinylidene fluoride ($VF_2$), preferably less than 5 weight percent $VF_2$ units, most preferably no $VF_2$ units. Weight percentages are based on total weight of the fluoroelastomer polymer. These fluoroelastomers are particularly resistant to attack by basic fluids. In the absence of $VF_2$ units (or when the level of $VF_2$ units is less than about 10 weight percent), such fluoroelastomers require incorporation of a cure site in order to be readily crosslinked by a polyhydroxy curative or by an organic peroxide and polyfunctional coagent curative system.

Suitable copolymerizable cure site monomers for crosslinking the fluoroelastomer by polyhydroxy curatives include, but are not limited to i) trifluoroethylene, ii) 3,3,3-trifluoropropene-1, iii) 1,2,3,3,3-pentafluoropropylene, iv) 1,1,3,3,3-pentafluoropropylene, and v) 2,3,3,3-tetrafluoropropene. When present, the level of copolymerized units of the above type of cure site monomer is between 0.1 to 15 weight percent, preferably 2 to 10 weight percent.

Suitable cure sites for crosslinking the fluoroelastomers with organic peroxides include, but are not limited to bromine endgroups, iodine endgroups, or a combination thereof. When present, the level of iodine or bromine endgroups is typically between 0.05 and 0.5 weight percent, based on the total weight of the fluoroelastomer polymer. Such cure sites may be introduced to the fluoroelastomer polymer chain by polymerization in the presence of a bromine- or iodine-containing chain transfer agent.

Examples of chain transfer agents include iodine-containing compounds that result in incorporation of bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo-1-hydroperfluoroethane, etc. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Cure sites for use in the peroxide curing of fluoroelastomers may also be introduced by copolymerization of the fluoroelastomer with cure site monomers that contain a bromine or iodine atom such as fluorinated olefins or fluorinated vinyl ethers. Such cure site monomers are well known in the art. Specific examples include bromotrifluoroethylene; 4-bromo-3,3,4,4-tetrafluorobutene-1 (BTFB); and others such as vinyl bromide, 1-bromo-2,2-difluoroethylene; perfluoroallyl bromide; 4-bromo-1,1,2-trifluorobutene; 4-bromo-1,1,3,3,4,4,-hexafluorobutene; 4-bromo-3-chloro-1,1,3,4,4-pentafluorobutene; 6-bromo-5,5,6,6-tetrafluorohexene; 4-bromoperfluorobutene-1 and 3,3-difluoroallyl bromide. Brominated unsaturated ether cure site monomers useful in the invention include 2-bromo-perfluoroethyl perfluorovinyl ether and fluorinated compounds of the class $CF_2Br-R_f-O-CF=CF_2$, such as $CF_2BrCF_2O-CF=CF_2$, and fluorovinyl ethers of the class $ROCF=CFBr$ or $ROCBr=CF_2$, where R is a lower alkyl group or fluoroalkyl group, such as $CH_3OCF=CFBr$ or $CF_3CH_2 OCF=CFBr$. Iodinated cure site monomers include $CHR=CH-Z-CH_2CHR-I$, wherein R is $-H$ or $-CH_3$; Z is a $C_1-C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF=CF_2$ and $ICH_2CF_2O[CF(CF_3)CF_2O]_nCF=CF_2$, and the like, wherein n=1–3, such as disclosed in U.S. Pat. No. 5,717,036. In addition, suitable ben iodinated cure site monomers including iodoethylene, 4-iodo-3,3,4,4-tetrafluorobutene-1(ITFB); 3-chloro-4-iodo-3,4,4-trifluorobutene; 2-iodo-1,1,2,2-tetrafluoro-1-(vinyloxy)ethane; 2-iodo-1-(perfluorovinyloxy)-1,1,2,2-tetrafluoroethylene; 1,1,2,3,3,3-hexafluoro-2-iodo-1-(perfluorovinyloxy)propane; 2-iodoethyl vinyl ether; 3,3,4,5,5,5-hexafluoro-4-iodopentene; and iodotrifluoroethylene are disclosed in U.S. Pat. No. 4,694,045. Allyl iodide and 2-iodo-perfluoroethyl perfluorovinyl ether are also useful cure site monomers. When present, the level of the above type of cure site monomer is typically between 0.5 and 7 weight percent, based on the total weight of the fluoroelastomer polymer.

Specific examples of such base-resistant polyhydroxy curable fluoroelastomers include, but are not limited to 1) fluoroelastomers containing copolymerized units of 45–80 weight percent tetrafluoroethylene, 10–40 weight percent propylene (P) and 0.1 to 15 weight percent 3,3,3-trifluoropropene-1; 2) fluoroelastomers containing copolymerized units of 45-80 weight percent tetrafluoroethylene, 10–40 weight percent propylene (P) and 10 to 15 weight percent vinylidene fluoride; 3) fluoroelastomers containing copolymerized units of 10 to 40 mole percent ethylene (E), 32 to 60 mole percent tetrafluoroethylene, 20 to 40 mole percent of a perfluoro(alkyl vinyl ether) (PAVE) such as perfluoro(methyl vinyl ether) and 0.1 to 15 mole percent of 3,3,3-trifluoropropene-1; and 4) fluoroelastomers containing copolymerized units of 5 to 10 weight percent ethylene (E), 40 to 48 weight percent tetrafluoroethylene, 43 to 51 weight percent of perfluoro(methyl vinyl ether) (PMVE), and 0.5 to 3 weight percent of 4-bromo-3,3,4,4-tetrafluorobutene-1 (BTFB). The latter polymer may also contain 0.05 to 0.5 weight percent iodine endgroups.

The fluoroelastomer compositions employed in this invention are curable with polyhydroxy compounds or with the combination of an organic peroxide and a polyfunctional coagent.

The same polyhydroxy compound may be used in the curable fluoroelastomer composition that was used in the primer composition above, or a different polyhydroxy compound may be used. Bisphenol AF, its derivatives such as mono-or-diesters, alkali metal salts and its salts and adducts with organo-onium compounds are preferred curatives. Typically the fluoroelastomer compositions contain between 01. to 10 phr (parts curative per hundred parts fluoroelastomer by weight) polyhydroxy curative, preferably 1 to 3 phr.

If cured with a polyhydroxy curative, the fluoroelastomer compositions employed in this invention also contain a vulcanization accelerator. Typically the accelerator is an organo-onium compound. The same organo-onium compound may be used in the curable fluoroelastomer composition that was used in the primer composition above, or a different organo-onium compound may be used. Generally the fluoroelastomer compositions contain between 0.1 to 10 phr (parts accelerator per hundred parts fluoroelastomer by weight) organo-onium compound, preferably 0.5 to 3 phr.

If cured with an organic peroxide and polyfunctional coagent, the fluoroelastomer compositions employed in this invention contain between 0.1 and 3 phr organic peroxide such as 1,1-bis(t-butylperoxy)-3,5,5-trimethylcyclohexane; 1,1-bis(t-butylperoxy)cyclohexane; 2,2-bis(t-butylperoxy) octane; n-butyl-4, 4-bis(t-butylperoxy)valerate; 2,2-bis(t-butylperoxy)butane; 2,5-dimethylhexane-2,5-dihydroxyperoxide; di-t-butyl peroxide; t-butylcumyl peroxide; dicumyl peroxide; alpha, alpha'-bis(t-butylperoxy-m-isopropyl)benzene; 2,5-dimethyl-2,5-di(t-butylperoxy) hexane; 2,5-dimethyl-2,5-di(t-butylperoxy)hexene-3; benzoyl peroxide, t-butylperoxybenzene; 2,5-dimethyl-2,5-di (benzoylperoxy)-hexane; t-butylperoxymaleic acid; and t-butylperoxyisopropylcarbonate. Compositions also contain between 0.1 to 10 phr polyfunctional coagent such as triallyl cyanurate, trimethacryl isocyanurate, triallyl isocyanurate, trimethallyl isocyanurate, triacryl formal, triallyl trimellitate, N,N'-m-phenylene bismaleimide, diallyl phthalate, tetraallylterephthalamide, tri(diallylamine)-s-triazine, triallyl phosphite, and N,N-diallylacrylamide.

The fluoroelastomer compositions also contain an acid acceptor. The acid acceptor is typically a strong organic base such as Proton Sponge® (available from Aldrich) or an oxirane, or an inorganic base such as a metal oxide, metal hydroxide, or a mixture of 2 or more of the latter. Metal oxides or hydroxides which are useful acid acceptors include calcium hydroxide, magnesium oxide, lead oxide, zinc oxide and calcium oxide. Calcium hydroxide and magnesium oxide are preferred. Typically the level of acid acceptor in the curable fluoroelastomer compositions is between 1 and 20 phr, preferably 1 and 10 phr.

Fluoroelastomer compositions employed in the laminates of this invention may also contain other additives commonly used in elastomer compounding and processing. The latter may be introduced into the composition before addition of the curative, simultaneously with it, or following the addition. Typical additives include fillers, plasticizers, processing aids, antioxidants, pigments, and the like. The amount of such ingredients which is added will depend on the particular end use applications for which the cured compositions are adapted. Fillers, such as carbon black, clays, barium sulfate, calcium carbonate, magnesium silicate, and fluoropolymers are generally added in amounts of from 5–100 parts by weight per 100 parts fluoroelastomer. The amount of plasticizer used is generally from 0.5–5.0 parts by weight per 100 parts fluoroelastomer. Typical plasticizers include esters, such as dioctyl phthalate and dibutyl sebacate. Processing aids are generally used in amounts of from 0.1–2.0 parts by weight per 100 parts fluoroelastomer. Suitable processing aids include octadecylamine, tetramethylene sulfone, p-chlorophenyl sulfone, and waxes, for example, carnauba wax, that aid in the processing of the compositions.

The laminates of this invention may be made by a process wherein the primer composition described above is first coated onto the metal, ceramic or glass substrate by dipping, spraying painting or the like. The solvent in the primer composition is then allowed to evaporate off at ambient or elevated temperature in order to form a film on the substrate surface. Lastly, the fluoroelastomer portion of the laminate is bonded to the primer film/metal portion in a conventional rubber-metal molding process such as an injection, compression, transfer, or hybrid process. Optionally, the laminate may be further cured (i.e. post cured) outside the mold in an oven at elevated temperature.

The primer compositions of the present invention are particularly useful in promoting adhesion between base-resistant, polyhydroxy or peroxide curable fluoroelastomers and metal, ceramic or glass surfaces, wherein the fluoroelastomer contains little, if any, copolymerized units of vinylidene fluoride. The primers are especially useful in applications wherein laminates are required which are exposed to high temperatures and basic fluids, such as in an automobile engine or transmission.

The following examples illustrate preferred embodiments of the present invention wherein all parts are by weight unless otherwise indicated.

EXAMPLES

Example 1

Various adhesion promoting primer compositions of the invention (Primers 1–2, 4–6) and controls (Control Primers A–C) were prepared by mixing the appropriate quantity of 3-glycidoxypropyltrimethoxy silane (A187 available from OSi Specialties Group of Witco), tetrabutylammonium hydroxide and bisphenol AF in methanol solvent. The compositions are shown in Table I. Also shown in Table I is a primer composition of the invention (Primer 3) containing A187 silane and the (1:1 molar) methyltributylammonium bisphenol AF salt, rather than the separate ingredients tetrabutylammonium hydroxide and bisphenol AF. Primer 7 of the invention was made in the same manner as Primers 1–2, 4–6 except that 3-glycidoxypropyltriethoxy silane was used in place of A187 as the epoxy-silane. Control Primer D was made by mixing the appropriate quantity of Chemlock 607 amino-silane (available from Lord Corp.) with methanol. Chemlock 607 is an amino-silane bonding agent commonly used in the industry for adhering fluoroelastomers to metal surfaces.

TABLE I

| Primer Solution | Silane, wt. % | Molar ratio Ammonium ion to silane | Molar Ratio OH groups on Bisphenol AF to Silane | Molar Ratio OH groups on Bisphenol AF to Ammonium ion |
|---|---|---|---|---|
| A | 23 | 0 | 0 | — |
| B | 18 | 0.3 | 0 | — |
| C | 17 | 0 | 1.22 | 0 |
| D | 17 | 0 | 0 | — |
| 1 | 17 | 0.3 | 1.22 | 0.25 |
| 2 | 17 | 0.3 | 1.84 | 0.16 |
| 3[1] | 17 | 0.3 | 0.6 | 0.50 |
| 4 | 17 | 0.5 | 2.0 | 0.25 |
| 5 | 9 | 0.5 | 2.0 | 0.25 |
| 6 | 4 | 0.5 | 2.0 | 0.25 |
| 7 | 17 | 0.3 | 1.23 | 0.25 |

[1]contains methyltributylammonium bisphenol AF salt

Example 2

The efficacy of some of the above primer compositions to improve adhesion between fluoroelastomers and metal was tested by the following procedure. Surfaces of 1"×2.5"×⅛" steel test coupons were prepared by degreasing in acetone or methylethyl ketone and then sandblasting. Freshly prepared steel coupons were dipped in the primer composition to be tested and then hung in a fume hood to dry for 2 hours at room temperature. When ready for molding, the metal coupons were placed in appropriately sized cavities in the bottom of a 6"×6" rubber mold. An approximately ¼" wide strip of Mylar® film was placed over each end of the metal coupons prior to placing 6"×6" preforms of uncured fluoroelastomer composition over the metal coupons. The Mylar® film thus provided a region where rubber could not stick to metal. The rubber/primer/metal laminates were compression molded for 15 minutes at 177° C. Some of the laminates were also post cured outside of the mold for 24 hours at 200° C. The resulting rubber and metal composite was cut into 1" wide strips incorporating the metal coupon. The metal coupon was held in a jig and the overhanging rubber was placed in the upper grip on an Instron tester and pulled at a 90° angle to the metal. The force required to separate the rubber from the metal coupon was recorded in units of Newtons per millimeter of width.

Curable composition F1 contained a base resistant fluoroelastomer precompound. The fluoroelastomer was comprised of copolymerized units of tetrafluoroethylene, propylene and about 10 wt. % or less vinylidene fluoride. The precompound also contained a bisphenol curative and accelerator. In addition to 100 phr (parts by weight per hundred parts rubber) of fluoroelastomer, composition F1 also contained 2 phr calcium oxide, 12 phr Maglite Y magnesium oxide (available from C. P. Hall), 30 phr Wollastocoat 10222 calcium silicate (available from Nyco Minerals) and 0.5 phr Strucktol WS280 PWD process aid (available from Strucktol Company of America). Composition F1 was made on a laboratory BR Banbury internal mixer by standard rubber processing techniques.

Composition F2 was similar to composition F1 except that F2 contained 2 phr calcium hydroxide in place of calcium oxide, 8 phr Elastomag 170 magnesium oxide (available from Akrochem Co.) in place of Maglite Y, and 30 phr Nyad 400 calcium silicate (available from Nyad Minerals) in place of the Wollastocoat 10222.

The force to pull the rubber from the metal was measured by Instron and is reported in Table II.

TABLE II

| Primer (Formulation) | Force, N/mm No Post Cure | Force, N/mm With Post Cure |
|---|---|---|
| A (F1) | 0.33 | 2.4 |
| B (F1) | 0 | 0.9 |
| C (F2) | 0 | 1.9 |
| 1 (F2) | 6.1 | 6 |
| 2 (F2) | 1.19 | 0.4 |
| 3 (F2) | 4.07 | 4.6 |
| 4 (F1) | 2.9 | 7.2 |
| 5 (F1) | 0.4 | 5.6 |
| 6 (F1) | 0.41 | 1.3 |

Example 3

Some of the adhesion tests of Example 2 were repeated with Primers 1 and 2 from Example 1, except that fluoroelastomer composition F3 was employed in place of compositions F1 or F2. Composition F3 contained a fluoroelastomer comprising copolymerized units of 76 wt. % tetrafluoroethylene, 20 wt. % propylene and 4 wt. % 3,3,3-trifluoropropene-1. In addition to 100 phr fluoroelastomer, composition F3 also contained 3 phr of a methyltributylammonium bisphenol AF salt, 8 parts Elastomag 170, 2 phr calcium hydroxide and 30 phr Nyad 400.

Adhesion test results are shown in Table IV.

TABLE IV

| Primer (Formulation) | Force, N/mm No Post Cure | Force, N/mm With Post Cure |
|---|---|---|
| 1 (F3) | 6.1 | 5 |
| 2 (F3) | 5.0 | 5.2 |

Example 4

With one change, the test method of Example 2 for measuring the force to separate rubber from metal was employed to determine the adhesion of fluoroelastomer composition F2 to metal, employing Primer 7 from Example 1. In this example, a fabric backing was molded over the rubber layer in order to reduce elongation of the rubber during Instron testing. Thus, the samples tested were metal, primer, rubber, fabric laminates. For comparison, a Control Sample was made using Control Primer D from Example 1. Results are shown in Table V.

TABLE V

| Primer | Force, N/mm No Post Cure | Force, N/mm With Post Cure |
|---|---|---|
| 7 | 8.8 | 5.6 |
| D | 0 | 0 |

Example 5

The same test method as employed in Example 4 was employed to measure the adhesion of fluoroelastomer composition F4 to metal with various Primers from Example 1. Composition F4 contained 100 parts of a fluoroelastomer copolymer of 7.7 wt. % ethylene units, 44 wt. % tetrafluoroethylene units, 47 wt. % perfluoro(methylvinyl ether) units, and 1.1 wt. % BTFB units. The fluoroelastomer also contained 0.2 wt. % iodine, located at endgroups. In addition to the fluoroelastomer, F4 contained 30 phr Nyad 400, 3 phr ZnO, 3 phr Diak 7 polyfunctional coagent (available from DuPont Dow Elastomers) and 3 parts Varox DBPH-50 organic peroxide (available from R. T. Vanderbilt). Results are shown in Table VI.

TABLE VI

| Primer | Force, N/mm No Post Cure | Force, N/mm With Post Cure |
|---|---|---|
| 1 | 6 | 5 |
| 3 | 5.2 | 6 |

What is claimed is:

1. A laminate comprising:
    a) a first layer of a substrate selected from the group consisting of metals, ceramics and glasses;
    b) a second layer of a primer composition comprising an epoxy-silane, a polyhydroxy compound and an organo-onium compound; and
    c) a third layer of a base resistant curable fluoroelastomer composition comprising i) a base-resistant fluoroelastomer, ii) a curing agent, and iii) an acid acceptor.

2. A laminate of claim 1 wherein said epoxy-silane is selected from the group consisting of 3-glycidoxypropyltrimethoxy silane; 3-glycidoxypropyltriethoxy silane; bis-2-[(3-epoxycyclohexyl)ethyl]tetramethyldisiloxane; 1,3-bis(3-glycidoxypropyl)tetramethyl disiloxane; 2-(3,4-epoxycyclohexyl)ethyl trimethoxy silane; 3-glycidoxypropyl dimethylethoxysilane; 3-glycidoxypropyl methyldiethoxysilane; 3-glycidoxypropyl methyldimethoxysilane; and 3-glycidoxypropyl pentamethyldisiloxane.

3. A laminate of claim 1 wherein said polyhydroxy compound is selected from the group consisting of i) dihydroxy-, trihydroxy-, and tetrahydroxy-benzenes, -naphthalenes, and -anthracenes; ii) bisphenols of the formula

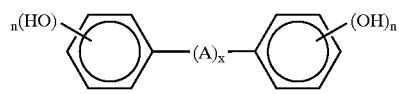

where A is a stable divalent radical; x is 0 or 1; and n is 1 or 2; iii) dialkali salts of said bisphenols, iv) quaternary ammonium salts of said phenols, and v) quaternary phosphonium salts of said bisphenols.

4. A laminate of claim 1 wherein said organo-onium compound is selected from the group consisting of beuzyltriphenylphosphonium chloride, benzyltriphenylphosphonium bromide, tetrabutylammonium hydrogen sulfate, tetrabutylammonium hydroxide, tetrapropylammonium hydroxide, tetrabutylammonium bromide, methyltributylammonium chloride, methyltributylammonium hydroxide, tributylallylphosphonium chloride, tributyl-2-methoxypropylphosphonium chloride, 1,8-diazabicyclo [5.4.0]undec-7-ene, benzyldiphenyl(dimethylamino) phosphonium chloride, methyltrioctylammonium chloride, benzyltrioctylphosphonium bromide, benzyhrioctylphosphonium chloride, methyltrioctyiphosphonium acetate, tetraoctylphosphonium bromide, methyltriphenylarsonium tetrafluoroborate, tetraphenylstibonium bromide, 4-chlorobenzyltriphenyl phosphonium chloride, 8-benzyl-1, 8-diazabicyclo(5.4.0)-7-undecenonium chloride, diphenylmethyltriphenylphosphonium chloride, allyltriphenylphosphonium chloride, tetrabutylphosphonium bromide, and m-trifluoromethyl-benzyltrioctylphosphonium chloride.

5. A laminate of claim 1 wherein said curing agent is a polyhydroxy compound.

6. A laminate of claim 1 wherein said curing agent is a combination of an organic peroxide and a polyfunctional coagent.

7. A laminate of claim 1 wherein said base-resistant fluoroelastomer is a copolymer selected from the group consisting of copolymerized units of i) 45–80 weight percent tetrafluoroethylene, 10–40 weight percent propylene and 0.1 to 15 weight percent 3,3,3-trifluoropropene-1; ii) 45–80 weight percent tetrafluoroethylene, 10–40 weight percent propylene and 10 to 15 weight percent vinylidene fluoride; iii) 10 to 40 mole percent ethylene, 32 to 60 mole percent tetrafluoroethylene, 20 to 40 mole percent of a perfluoro (alkyl vinyl ether) and 0.1 to 15 mole percent of 3,3,3-trifluoropropene-1; and iv) 5 to 10 weight percent ethylene, 40 to 48 weight percent tetrafluoroethylene, 43 to 51 weight percent of perfluoro(methyl vinyl ether), and 0.5 to 3 weight percent of 4-bromo-3,3,4,4-tetrafluorobutene-1.

* * * * *